United States Patent Office 3,364,234
Patented Jan. 16, 1968

3,364,234
CHROMAN COMPOUNDS AND
PREPARATION OF SAME
Erwin F. Schoenewaldt, Watchung, N.J., assignor to
Merck & Co., Inc., Rahway, N.J., a corporation
of New Jersey
No Drawing. Continuation-in-part of application Ser. No.
332,287, Dec. 20, 1963. This application Dec. 28, 1966,
Ser. No. 605,211
11 Claims. (Cl. 260—345.5)

ABSTRACT OF THE DISCLOSURE 7,8-dimethoxy - 2,5 - dimethyl-6-hydroxy-2-(4',8',12'-trimethyltridecyl)chroman is prepared from 2,3-dimethoxy-5-methylbenzoquinone by reduction with an excess of a metallic reducing agent in an excess of an acidic medium to produce the corresponding hydroquinone which is then condensed in situ with phytol or isophytol. The thus produced chroman inhibits the oxidation of various animal and vegetable fats, and has pharmacological importance related to the biological activity of coenzyme Q, and can be used in the treatment of macrocytic anemias.

CROSS REFERENCES TO RELATED APPLICATIONS

This application is a continuation-in-part of applicant's co-pending application United States Ser. No. 332,287, filed Dec. 20, 1963, now abandoned.

BACKGROUND OF THE INVENTION

1. *Field of the invention*

The invention pertains to a process for the preparation of chromanol compounds which are useful antioxidants and which have nutritional and pharmacological importance.

2. *Description of prior art*

Heretofore, 2,3 - dimethoxy-5-methylbenzoquinone has been reduced to the corresponding hydroquinone which has been isolated prior to condensation with phytol or isophytol. Since hydroquinones are known to be extremely sensitive to aerial oxidation, the yield of condensate obtained by this means is considerably reduced and the purity of the product affected by the reoxidation of the hydroquinone to the quinone.

The following references were made of record in copending application 332,287:

Australia—246,437; Austria—215,995; Canada—453,166; Canada—577,760; Germany—712,745; Germany—713,749; Germany—748,893; and Great Britain—529,082.

SUMMARY OF INVENTION 7,8-dimethoxy - 2,5 - dimethyl-6-hydroxy-2(4',8'-12'-trimethyltridecyl)chroman is prepared by reducing 2,3-dimethoxy-5-methylbenzoquinone with an excess of a metallic reducing agent in the presence of a large excess of an acidic medium and condensing the thus produced hydroquinone with phytol or isophytol in situ, that is to say, in the presence of the acidic reducing medium.

The thus produced chroman inhibits the oxidation of various animal and vegetable fats and has pharmacological importance related to the biological activity of coenzyme Q and can be used in the treatment of macrocytic anemias.

DESCRIPTION OF THE PREFERRED EMBODIMENTS 7,8-dimethoxy - 2,5 - dimethyl-6-hydroxy-2-(4',8',12'-trimethyltridecyl)chroman may be produced directly from 2,3-dimethoxy-5-methylbenzoquinone without isolating any of the intermediate products by first reacting said benzoquinone with an excess of a metallic reducing agent in the presence of a large excess of an acidic medium. From about 1.25 to about 5 equivalents of reducing agent relative to the quinone may be used, from 2 to 3.5 equivalents of reducing agent being preferred. From about 50 to about 1,000 equivalents of acid relative to the benzoquinone may be used, 300 to 500 equivalents of acid being preferred. It should be noted, however, that these quantities are by no means critical, it being merely important to maintain an excess of reducing agent and an excess of acid after the benzoquinone has been reduced to the corresponding hydroquinone. The thus produced hydroquinone is then reacted in situ, that is to say, in the presence of the remaining metallic reducing agent in the acidic medium with condensing agents such as phytol or isophytol to form 7,8-dimethoxy-2,5-dimethyl-6-hydroxy-2-(4',8',12'-trimethyltridecyl)chroman. The chroman is recovered from the reaction mixture according to methods known to the art.

In carrying out the first step of this invention, it is found that the reduction of the quinone can be effected by reaction with metallic reducing agents such as zinc, iron or tin in an acidic medium. Lower organic acids, for example, formic or acetic acid or an acid such as polyphosphoric acid can be used to obtain the desired acidic medium. Combinations of acids and combinations of inert diluents and acids such as benzene and acetic acid can also be employed as reaction solvents. It is preferred to carry out the reduction under substantially anhydrous conditions since the quinone and the condensing agent are more soluble in such mediums. It has been found that in order to obtain optimum yields, the reduction should be effected at a temperature of about 90° C. or higher and should be carried out in an inert atmosphere. It is believed that the presence of residual unreacted metal provides a reducing atmosphere which serves to protect the hydroquinone formed from oxidative decomposition during the condensation step of the reaction.

In particular, it has been found that the reaction embodied in this invention gives optimum yields when zinc and substantially anhydrous formic acid are used as the metallic reducing agent and acidic medium respectively.

The following examples are given for the purpose of illustration and not by way of limitation.

EXAMPLE 1

To 50 ml. of substantially anhydrous formic acid (K.F. 20 mg./ml.) is added 5.0 g. of 2,3-dimethoxy-5-methylbenzoquinone and 0.2 g. of zinc dust. The mixture is stirred and heated under a nitrogen atmosphere to 85° C. at which point an exothermic reaction begins. While maintaining the temperature at 80–90° C., an additional 4.8 g. of zinc dust is added in portions over a period of about 15 minutes. At this time, 16.14 g. of phytol is added and the mixture heated under reflux with stirring for approximately 3 hours while maintaining a nitrogen atmosphere. The reaction mixture is then cooled to room temperature, diluted with methylene chloride and filtered. The filter residue is washed with methylene chloride and the combined filtrate is washed with water and a saturated aqueous sodium bicarbonate solution. The organic solution is dried over magnesium sulfate and concentrated in vacuo to obtain 7,8 - dimethoxy-2,5-dimethyl-6-hydroxy-2-(4',8', 12'-trimethyltridecyl)chroman as a dark yellow viscous oil.

The crude chromanol is purified by dissolving it in 225 ml. of anhydrous methanol, adding 6 ml. of 1.2 N sodium methoxide in methanol under a nitrogen atmosphere, stirring for 5 minutes, acidifying the mixture by the addition of 1 ml. of glacial acetic acid, vacuum concentrating to a small volume, redissolving in iso-octane, drying over magnesium sulfate and concentrating under vacuum until a constant weight is reached. The weight of 7,8-dimethoxy-2,5-dimethyl - 6 - hydroxy-2-(4',8',12'-trimethyltridecyl) chroman obtained is 12.75 g. with $$E_{1cm.}^{1\%} = 68 \text{ at } 293 \text{ m}\mu$$

The infrared spectrum at this point is superimposable on that of a reference standard. The chromanol can be further purified by short-path distillation in a suitable still. The 7,8 - dimethoxy-2,5-dimethyl-6-hydroxy-2-(4',8',12'-trimethyltridecyl)chroman obtained in this manner is a clear light yellow viscous oil, distilling at 155–160° C. at $10^{-2}$ mm. pressure.

In accordance with the above procedure, but using an equivalent amount of isophytol in place of phytol, there is obtained 7,8-dimethoxy-2,5-dimethyl - 6 - hydroxy-2-(4',8',12'-trimethyltridecyl)chroman.

EXAMPLE 2

To 50 ml. of glacial acetic acid is added 5.0 g. of 2,3-dimethoxy-5-methylbenzoquinone and 0.2 g. of zinc dust. The mixture is stirred and heated under a nitrogen atmosphere to 85° C. at which point an exothermic reaction begins. While maintaining the temperature at 80–90° C., an additional 4.8 g. of zinc dust is added in portions over a period of about 15 minutes. At this time, 16.14 g. of phytol is added and the mixture heated under reflux with stirring for approximately 3 hours while maintaining a nitrogen atmosphere. The reaction mixture is then cooled to room temperature, diluted with methylene chloride and filtered. The filter residue is washed with methylene chloride and the combined filtrate is washed with water and a saturated aqueous sodium bicarbonate solution. The organic solution is dried over magnesium sulfate and concentrated in vacuo to obtain 7,8-dimethoxy-2,5-dimethyl-6-hydroxy-2-(4',8',12' - trimethyltridecyl)chroman as a dark yellow viscous oil.

The crude chromanol is purified by dissolving it in 225 ml. of anhydrous methanol, adding 6 ml. of 1.2 N sodium methoxide in methanol under a nitrogen atmosphere, stirring for 5 minutes, acidifying the mixture by the addition of 1 ml. of glacial acetic acid, vacuum concentrating to a small volume, redissolving in iso-octane, drying over magnesium sulfate and concentrating under vacuum until a constant weight is reached. The weight of 7,8-dimethoxy-2,5-dimethyl-6-hydroxy-2-(4',8',12' - trimethyltridecyl)chroman obtained is 12.75 g. with $$E_{1cm.}^{1\%} = 68 \text{ at } 293 \text{ m}\mu$$

The infrared spectrum at this point is superimposable on that of a reference standard. The chromanol can be further purified by short-path distillation in a suitable still. The 7,8-dimethoxy-2,5-dimethyl - 6 - hydroxy-2-(4',8',12' - trimethyltridecyl)chroman obtained in this manner is a clear light yellow viscous oil, distilling at 155–160° C. at $10^{-2}$ mm. pressure.

In accordance with the above procedure, but using an equivalent amount of isophytol in place of phytol, there is obtained 7,8-dimethoxy-2,5-dimethyl - 6 - hydroxy-2-(4',8',12'-trimethyltridecyl)chroman.

In accordance with the above procedure, but using an equivalent amount of polyphosphoric acid in place of acetic acid, there is obtained 7,8-dimethoxy-2,5-dimethyl-6-hydroxy-2-(4',8',12'-trimethyltridecyl)chroman.

EXAMPLE 3

To 50 ml. of substantially anhydrous formic acid (K.F. 20 mg./ml.) is added 5.0 g. of 2,3-dimethoxy-5-methylbenzoquinone and 0.2 g. of finely divided iron. The mixture is stirred and heated under a nitrogen atmosphere to 85° C. at which point an exothermic reaction begins. While maintaining the temperature at 80–90° C., an additional 4.8 g. of finely divided iron is added in portions over a period of about 15 minutes. At this time, 16.14 g. of phytol is added and the mixture heated under reflux with stirring for approximately 3 hours while maintaining a nitrogen atmosphere. The reaction mixture is then cooled to room temperature, diluted with methylene chloride and filtered. The filter residue is washed with methylene chloride and the combined filtrate is washed with water and a saturated aqueous sodium bicarbonate solution. The organic solution is dried over magnesium sulfate and concentrated in vacuo to obtain 7,8-dimethoxy-2,5 - dimethyl-6-hydroxy-2-(4',8',12' - trimethyltridecyl)chroman as a dark yellow viscous oil.

The crude chromanol is purified by dissolving it in 225 ml. of anhydrous methanol, adding 6 ml. of 1.2 N sodium methoxide in methanol under a nitrogen atmosphere, stirring for 5 minutes, acidifying the mixture by the addition of 1 ml. of glacial acetic acid, vacuum concentrating to a small volume, redissolving in iso-octane, drying over magnesium sulfate and concentrating under vacuum until a constant weight is reached. The weight of 7,8-dimethoxy-2,5-dimethyl-6-hydroxy - 2 - (4',8',12'-trimethyltridecyl)chroman obtained is 12.75 g. with $$E_{1cm.}^{1\%} = 68 \text{ at } 293 \text{ m}\mu$$

The infrared spectrum at this point is superimposable on that of a reference standard. The chromanol can be further purified by short-path distillation in a suitable still. The 7,8 - dimethoxy-2,5-dimethyl-6-hydroxy-2-(4',8',12'-trimethyltridecyl)chroman obtained in this manner is a clear light yellow viscous oil, distilling at 155–160° C. at $10^{-2}$ mm. pressure.

In accordance with the above procedure, but using an equivalent amount of isophytol in place of phytol, there is obtained 7,8-dimethoxy-2,5-dimethyl - 6 - hydroxy-2-(4',8',12'-trimethyltridecyl)chroman.

In accordance with the above procedure, but using an equivalent amount of tin in place of iron, there is obtained 7,8-dimethoxy-2,5-dimethyl - 6 - hydroxy-2-(4',8',12'-trimethyltridecyl)chroman.

We claim:

1. A process which comprises reacting 2,3-dimethoxy-5-methylbenzoquinone with an excess of a metallic reducing agent where said agent is zinc, iron or tin in the presence of an excess of an acid where said acid is acetic, formic or polyphosphoric acid under substantially anhydrous conditions and adding a condensing agent where said condensing agent is phytol or isophytol to the resulting reaction mixture to produce 7,8-dimethoxy-2,5-dimethyl-6-hydroxy-2-(4',8',12' - trimethyltridecyl)chroman.

2. A process according to claim 1 wherein the metallic reducing agent is zinc, the acid is formic acid and the condensing agent is phytol.

3. A process according to claim 1 wherein the reducing agent is zinc, the acid is formic acid and the condensing agent is isophytol.

4. A process according to claim 1 wherein the metallic reducing agent is zinc, the acid is acetic acid and the condensing agent is phytol.

5. A process according to claim 1 wherein the reducing agent is zinc, the acid is acetic acid and the condensing agent is isophytol.

6. A process according to claim 1 wherein the metallic reducing agent is iron, the acid is formic acid and the condensing agent is phytol.

7. A process according to claim 1 wherein the reducing agent is iron, the acid is formic acid and the condensing agent is isophytol.

8. A process according to claim 1 wherein the metallic reducing agent is zinc, the acid is polyphosphoric acid and the condensing agent is phytol.

9. A process according to claim 1 wherein the reducing agent is zinc, the acid is polyphosphoric acid and the condensing agent is isophytol.

10. A process according to claim 1 wherein the metallic reducing agent is tin, the acid is acetic acid and the condensing agent is phytol.

11. A process according to claim 1 wherein the reducing agent is tin, the acid is acetic acid and the condensing agent is isophytol.

References Cited

FOREIGN PATENTS

| | | |
|---|---|---|
| 712,745 | 10/1941 | Germany. |
| 748,893 | 11/1944 | Germany. |
| 713,749 | 11/1941 | Germany. |
| 215,995 | 7/1961 | Austria. |
| 529,082 | 11/1940 | Great Britain. |
| 453,166 | 12/1948 | Canada. |
| 577,760 | 6/1959 | Canada. |
| 246,437 | 8/1963 | Australia. |

JOHN D. RANDOLPH, *Primary Examiner.*

JOHN M. FORD, *Assistant Examiner.*